US009120581B2

(12) United States Patent
Costes et al.

(10) Patent No.: US 9,120,581 B2
(45) Date of Patent: Sep. 1, 2015

(54) MONITORING OF A FLIGHT CONTROL ACTUATOR OF AN AIRCRAFT

(75) Inventors: Regis Costes, Toulouse (FR); Laurence De Verbigier, Tournefeuille (FR); Frank Begout, Balma (FR); Laurent Andrieu, Aucamville (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 534 days.

(21) Appl. No.: 13/412,199

(22) Filed: Mar. 5, 2012

(65) Prior Publication Data
US 2012/0239244 A1 Sep. 20, 2012

(30) Foreign Application Priority Data

Mar. 16, 2011 (FR) ...................................... 11 52152

(51) Int. Cl.
*B64D 45/00* (2006.01)
*B64F 5/00* (2006.01)
*B64C 13/50* (2006.01)

(52) U.S. Cl.
CPC .............. *B64D 45/00* (2013.01); *B64C 13/503* (2013.01); *B64F 5/0045* (2013.01); *B64D 2045/0085* (2013.01)

(58) Field of Classification Search
CPC .......... B64F 5/00; B64F 5/0045; G06F 19/00; B64D 45/00; B64D 2045/0085
USPC ........... 701/29.1, 29.4, 31.9, 32.7, 32.9, 33.4, 701/34.4
See application file for complete search history.

(56) References Cited

U.S. PATENT DOCUMENTS

| 7,366,590 | B2 * | 4/2008 | Balasu ............................... 701/3 |
| 8,260,492 | B2 * | 9/2012 | Stange et al. ................ 701/34.3 |
| 2002/0162539 | A1 * | 11/2002 | Bolz et al. ...................... 123/479 |
| 2006/0113933 | A1 * | 6/2006 | Blanding et al. .............. 318/116 |

(Continued)

FOREIGN PATENT DOCUMENTS

EP 0 407 179 A1 1/1991
EP 0 743 583 A2 11/1996
(Continued)

OTHER PUBLICATIONS

Active Pitch Link Actuator for Impedance Control of Helicopter Vibration, by Andrei Mander, Daniel Feszty, and Fred Nitzsche, Presented at the American Helicopter Society 64th Annual Forum, Montréal, Canada, Apr. 29-May 1, 2008.*

(Continued)

*Primary Examiner* — John Q Nguyen
*Assistant Examiner* — Michael Whalen
(74) *Attorney, Agent, or Firm* — Oblon, McClelland, Maier & Neustadt, L.L.P.

(57) ABSTRACT

The invention concerns a system for monitoring a flight control actuator of an aircraft, including:
an actuator (1),
sensors (3a-3d) in the actuator (1) to collect, during each flight of the aircraft, series of measurements of parameters relative to the said actuator,
processing means (5) to calculate a set of damage indicators using, cumulatively, the series of measurements observed during each of the aircraft's successive flights, and
a memory (7; 7a) to store the said set of damage indicators, where the said memory is integrated in the actuator.

15 Claims, 3 Drawing Sheets

(56) References Cited

U.S. PATENT DOCUMENTS

| | | | |
|---|---|---|---|
| 2007/0033195 A1* | 2/2007 | Stange et al. | 707/10 |
| 2007/0033435 A1* | 2/2007 | Stange et al. | 714/15 |
| 2007/0034009 A1* | 2/2007 | Pado | 73/579 |
| 2007/0135975 A1* | 6/2007 | Stange et al. | 701/3 |
| 2008/0036617 A1 | 2/2008 | Arms et al. | |
| 2010/0250047 A1 | 9/2010 | Balasu et al. | |
| 2012/0197480 A1* | 8/2012 | Beninca et al. | 701/29.9 |

FOREIGN PATENT DOCUMENTS

| | | |
|---|---|---|
| EP | 2 026 158 A2 | 2/2009 |
| FR | 2 924 538 A1 | 6/2009 |

OTHER PUBLICATIONS

European Search Report issued Jul. 16, 2012 in Patent Application No. EP 12 15 8619.

* cited by examiner

MONITORING OF A FLIGHT CONTROL ACTUATOR OF AN AIRCRAFT

FIELD OF THE INVENTION

The present invention relates to the field of monitoring of a flight control actuator of an aircraft, and in particular a primary flight control actuator.

Aircraft have flight control systems in which the mechanical actions on attitude control devices (joystick, rudder bar, etc.), and/or data taken from the automatic pilot, are converted into analog signals which are transmitted to actuators operating equipment or control surfaces, for example an aileron, an elevator, a rudder, or an airbrake to control flight functions of roll, yaw, pitch and aerodynamic braking of the aircraft.

In service the flight control actuators are subject to stresses (for example, movements, variations of forces, of temperature, etc.) which gradually damage the different portions of the equipment.

The flight control actuators are therefore qualified by tests to last for the aircraft's lifetime without failure.

More specifically, flight control actuators are qualified in terms of durability in relation to several aspects. A first aspect concerns structural fatigue relating to an alternating external force. A second aspect concerns endurance relating to a movement combined with an external force, concerning in particular the moving mechanical elements (joints, ball-and-socket joints, pumps, engines, etc.). A third aspect concerns thermal endurance, particularly in respect of the electronic components.

The tests (movement/force) are defined on the basis of standard flight missions which are simulated and rationalised using conventional aeronautical techniques in order to obtain representative damage, through automated simulation and rationalisation programs such as the "Rainflow" algorithm for fatigue.

Qualification is then extended until failure (i.e. until rupture due to fatigue and functional failure in the case of endurance), so as to determine the existing margins relative to the specified lifetime and the actuator's absolute estimated service life.

However, the correlation between the qualified life and the service life of a given actuator is difficult to establish as things currently stand.

Indeed, the method of qualification remains theoretical and flight missions can vary from one aircraft to another.

In addition, data concerning the use of the actuators can be lost, bearing in mind that the actuators can be repaired and reinstalled in another aircraft, and that the data from certain airlines can not necessarily be up-to-date.

Furthermore, abnormal use of an actuator (for example, an excessive load) is not reported until a failure is detected by the aircraft's monitoring system, or during a maintenance operation.

Thus, due to safety considerations, and due to the aspects mentioned above, the use of all the actuators of an aircraft is limited to the theoretical and standard assessment of the oldest aircraft in the fleet (fleet leader).

However, this leads to major limitations in relation to the period of use of the actuators, and therefore a penalty concerning the aspects of availabilities, costs and maintenance operations.

The object of the present invention is consequently the monitoring of a flight control actuator of an aircraft to determine in automated fashion its real remaining estimated service life, to gain knowledge of how it is being used, and to forecast any risk of failure without having the abovementioned disadvantages.

OBJECT AND SUMMARY OF THE INVENTION

The present invention concerns a system for monitoring a flight control actuator of an aircraft, including:
  an actuator,
  sensors in the actuator to collect, during each flight of the aircraft, series of measurements of parameters relative to the said actuator,
  processing means to calculate a set of damage indicators using, cumulatively, the series of measurements observed during each of the aircraft's successive flights, and
  a memory to store the said set of damage indicators.

This enables advantage to be taken of the existence of sensors in the actuator to determine in automated fashion the state of damage of the actuator. The damage indicator is a datum which can provide information concerning the actuator's expired service life, and concerning the type of stresses experienced.

Advantageously, the said memory is integrated in the actuator.

This configuration enables effective traceability of the actuator to be provided, due to the fact that the stored data is indissociable from the actuator. This eliminates the problem of loss of data concerning the actuator's history. Indeed, the data follows the actuator independently of the aircraft, and thus prevents standard application on the basis of the oldest aircraft in the fleet (fleet leader).

According to one feature of the present invention, the processing means are configured to calculate current indicators representative of the series of current measurements observed in each current flight of the aircraft, and the processing means are configured to calculate the said damage indicators by totalling one-by-one in a corresponding fashion each of the said current indicators with each of the previous damage indicators taken from the said storage means.

This enables precise damage indicators to be determined simply, whilst optimising the computation time and the required memory space.

Advantageously, the said processing means are configured to analyse the said set of damage indicators in order to diagnose the state of damage of various elements of the said actuator.

This enables the remaining estimated service life of the actuator and the type of stresses experienced to be determined. In addition, the feedback concerning the real stresses on the actuator in service enables these to be compared with the theoretical stresses used for the qualification, enabling the theoretical missions to be adjusted and dimensioning of the actuator to be optimised. The available data can also assist investigations and maintenance operations.

Advantageously, the said set of damage indicators includes at least one indicator of expired estimated service life of the said actuator, and the processing means are configured to compare the said indicator of expired estimated service life with the absolute estimated service life in order to determine the remaining estimated service life of the said actuator.

By this means data is made available concerning the remaining estimated service life, which enables the actuator's lifetime to be extended. In addition, it is possible to adjust the maintenance intervals precisely according to the remaining lifetime indicators, enabling the standard maintenance actions to be reduced.

Advantageously, the said set of damage indicators includes at least one failure indicator indicating a risk of failure of the said actuator, and the processing means are configured to compare the said failure indicator with a predefined threshold value in order to detect a risk of failure.

This enables the state of failure to be detected and forecast precisely, enabling the monitored equipment to be replaced as early as possible, depending on the criticality of the failure.

Advantageously, the said set of damage indicators includes at least one indicator from among the following: number of flight cycles, number of flight hours, total displacement, number of times a limit load has been exceeded, number of activations, fatigue cycles and endurance cycles.

This enables the damage indicators to be monitored to be selected on the basis of the computing power of the processing means.

According to one aspect of the present invention the said actuator includes a control module connected to the said sensors, where the said control module is configured to send the said series of measurements via a communication system of the aircraft to the processing means installed on board the aircraft, and the said processing means are configured to calculate the damage indicators in real time, before sending them to the control module which is configured to store them in the said memory.

This enables the calculation to be made in real time during the flight in order to store only the result of the calculations in the memory integrated in the actuator, thus enabling both the memory space required for the memory integrated in the actuator and the memory used for real-time calculation by the computation unit to be minimised.

According to a variant of the present invention, the series of measurements observed during each flight of the aircraft are recorded in storage means on board the aircraft, and the processing means are configured to calculate the set of damage indicators when the aircraft is not in flight.

Accomplishing the calculations at the end of the flight when the aircraft is on the ground enables the computation power required in flight to be minimised.

The invention also concerns a flight control actuator of an aircraft configured to be in connection with a computer on board the aircraft, where the said actuator includes:
  sensors to collect, during each flight of the aircraft, series of measurements of parameters relative to the said actuator, and
  a non-volatile memory physically integrated in the actuator to store a set of damage indicators calculated by the said computer by using cumulatively the series of measurements observed during each of the aircraft's successive flights.

The invention also concerns an aircraft including the monitoring system and/or the actuator according to the above characteristics.

The invention also concerns a method for monitoring a flight control actuator of an aircraft, including the following steps:
  collecting, during each flight of the aircraft, series of measurements of parameters relative to the said actuator,
  calculating a set of damage indicators, using, in cumulative fashion, the series of measurements observed during each of the aircraft's successive flights, and
  recording the said set of damage indicators in a non-volatile memory physically integrated in the actuator.

The invention also concerns a computer program including code instructions for implementing the monitoring method according to the above characteristics when it is executed by processing means.

BRIEF DESCRIPTION OF THE ILLUSTRATIONS

Other features and advantages of the device and of the method according to the invention will be better understood on reading the description given below, by way of example, but not restrictively, with reference to the appended illustrations, in which.

DETAILED DESCRIPTION OF EMBODIMENTS

The principle of the invention consists in exploiting optimally the presence of the on-board sensors to assess in automated fashion the damage of the actuators in an aircraft, and in particular the flight control actuators.

Figure 1:
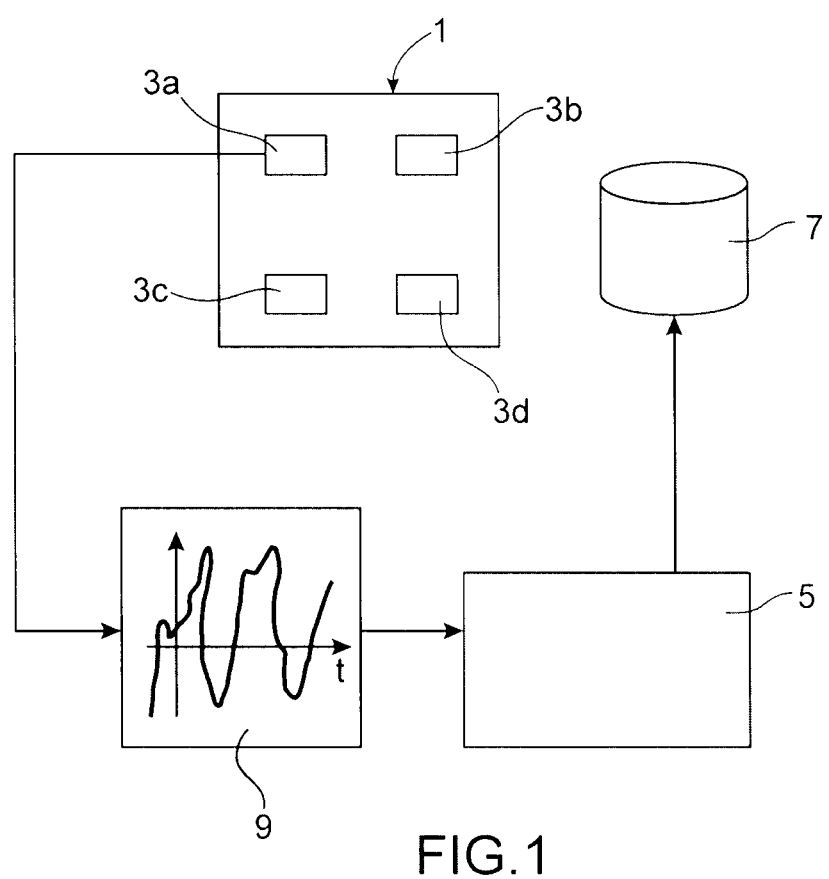
FIG. 1 illustrates diagrammatically a system for monitoring a flight control actuator of an aircraft according to the invention.

FIG. 1 illustrates diagrammatically a system or method for monitoring a flight control actuator of an aircraft according to the invention.

This system includes a flight control actuator 1, sensors 3, processing means 5, and data storage means (or storage memory) 7.

Processing means 5 include a computer program including code instructions suitable for implementing the monitoring method according to the invention.

Flight control actuator 1 may be an actuator of the hydraulic, electro-hydraulic, electrically-assisted electro-hydraulic, electro-hydrostatic or electromechanical type.

Flight control actuator 1 is generally fitted with multiple sensors 3a-3d such as pressure, position and temperature sensors, and also with other types of sensors or gauges. The measurements provided by these sensors 3a-3d are used by flight control computers to control actuator 1.

Sensors 3a-3d installed in actuator 1 are configured to gather series of measurements of parameters concerning the actuator in service.

For example, pressure sensor 3a or a stress gauge provides a spectrum 9 of force sustained by actuator 1 over time, and can thus provide information concerning fatigue. Pressure sensor 3a can also be used to detect an exceedance of the limit load of actuator 1. Thus, every abnormal use which exceeds the dimensioning of actuator 1 can be detected by means of the measurements gathered by pressure sensor 3a.

Position sensor 3b provides a spectrum of movements of the actuator's moving elements, and thus provides information concerning the total displacement (sum of movements), which is one of the parameters whereby endurance damage may be assessed.

Thermal sensor 3c in particular detects overheating of the electronic portion of the actuator, and therefore provides a temperature spectrum over time.

In addition, several sensors can be used in a calculation to determine one indicator. For example the combination of the data from pressure sensor 3a and from position sensor 3b enables the endurance sustained by the actuator's ball-and-socket joints to be calculated.

Thus, the different parameters observed by sensors 3a-3d include, for example, the pressure or stresses sustained by the actuator, the temperature of the actuator's electronic elements, the position or total displacement of the actuator's moving elements, the load sustained by the actuator, etc.

In accordance with the invention, these series of measurements observed in each of the aircraft's successive flights are used cumulatively by processing means 5 to calculate a set of damage indicators which is then stored in the data storage means (or the storage memory). It will be noted that a damage indicator is an indicator of the actuator's expired estimated service life and/or an indicator of the actuator's failure.

More specifically, in each current flight of the aircraft, processing means 5 are configured to calculate current indicators representative of the series of current measurements observed or detected by the various sensors 3a-3d. Processing means 5 then calculate the damage indicators by totalling one-by-one in a corresponding fashion each of the current indicators with each of the previous damage indicators taken from memory 7.

In other words, the current series of measurements of a given parameter observed in a current flight of the aircraft is used to calculate a current indicator representing the change of this parameter. A damage indicator associated with the same parameter is then calculated cumulatively by adding the current indicator to a previous damage indicator which has been calculated and recorded during the flight preceding the aircraft's current flight.

In addition, processing means 5 are configured to analyse all the damage indicators in order to diagnose the state of damage of actuator 1 or of the different elements of actuator 1. The analysis includes a comparison between each damage indicator and a reference value or a predetermined threshold defined by the value of the indicator when failure occurs observed during qualification. This comparison enables the remaining estimated service life of actuator 1 to be assessed. The comparison also enables the type of stresses experienced by actuator 1 to be determined, and consequently a risk of failure to be forecast. In addition, knowledge of the actual stresses on actuator 1 enables the diagnoses to be refined in the event of a malfunction, and the theoretical missions and dimensioning of the actuator to be adjusted.

Advantageously, memory 7 (of the non-volatile memory type) is physically integrated in the actuator. Thus, data concerning the damage indicators stored in memory 7 is indissociable from actuator 1 and follows the latter regardless of the fact that it may be removed from an aircraft and then installed in another aircraft.

Permanent installation of the non-volatile memory in the actuator enables the continuously accumulated damage indicators to be associated with the actuator. Memory 7 may be interrogated either on the aircraft or in a repair shop, in order to determine the remaining estimated service life and the way in which actuator 1 has been used. This data can also be precious during a trouble-shooting investigation.

As an addition to direct storage in the actuator a method of storage on the ground may also be used by means of maintenance and aircraft/ground communication platforms. This enables the estimated service life of actuator 1 to be managed in real time.

Figure 2:
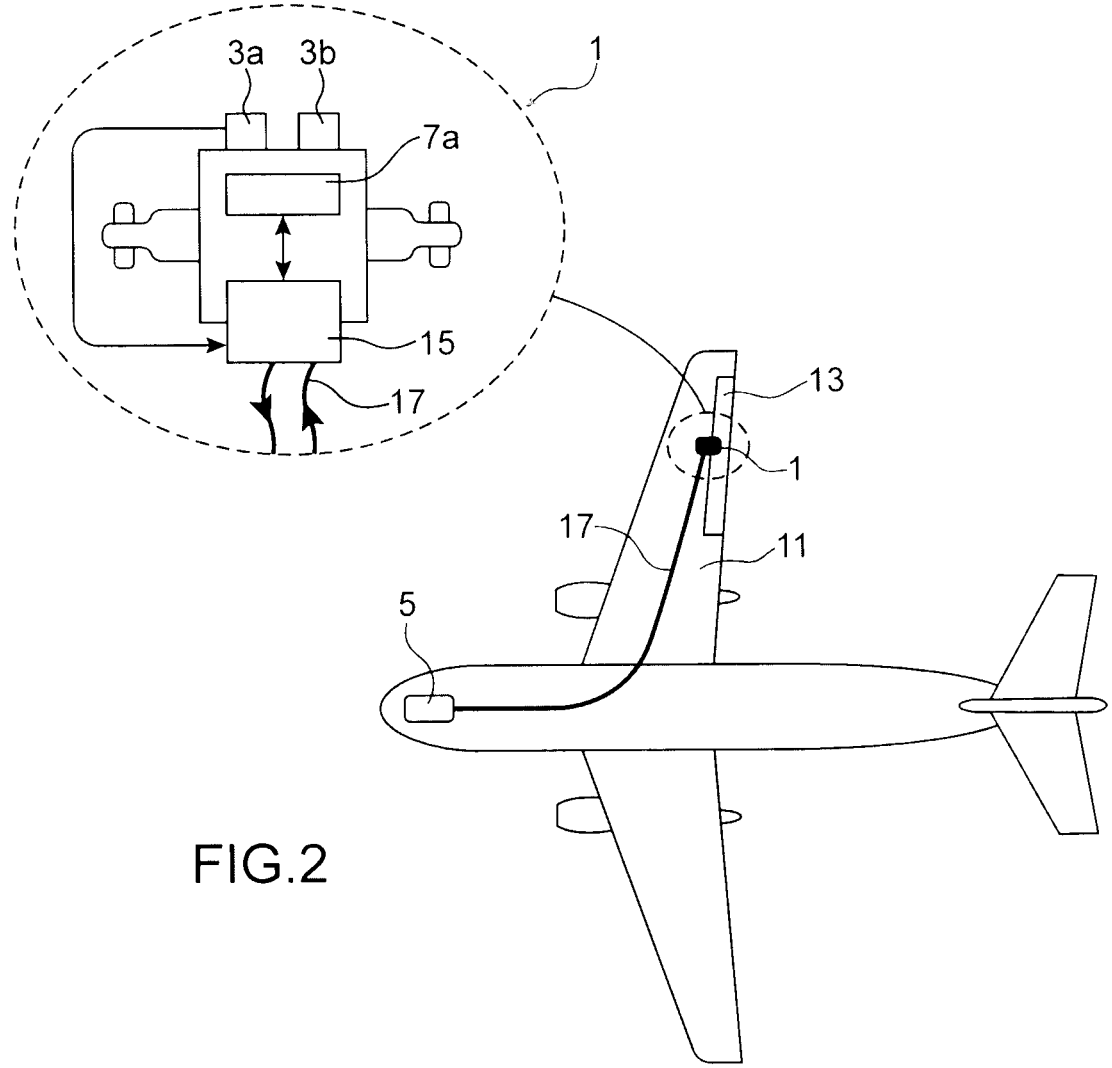
FIG. 2 illustrates diagrammatically an example of the monitoring system of FIG. 1 fitted in an aircraft.

FIG. 2 illustrates diagrammatically an example of an actuator monitoring system in an aircraft according to the invention.

According to this example flight control actuator 1 is a primary flight control actuator installed on a wing 11 for operating an aileron 13.

Actuator 1 is fitted with several sensors 3a, 3b, an electronic command or control module 15, and a non-volatile memory 7a.

Control module 15 is connected via a digital communication system 17 of the aircraft (for example, a data bus) to processing means 5 (for example a control computer) installed on board the aircraft. Control module 15 is also connected to sensors 3a, 3b and to memory 7a of the actuator. It will be noted that control module 15 can be removed from the aircraft, and it is consequently advantageous to dissociate it from memory 7a in order that the latter is not removable, and remains physically connected to actuator 1.

According to this example, control module 15 continuously sends the measurements or signals from sensors 3a, 3b to processing means 5 via communication system 17.

Processing means 5 execute signal processing algorithms in order to analyse in real time the signals originating from control module 15 in order to calculate the damage indicators' values. Advantageously, the algorithms used to calculate the damage indicators are the same as those habitually used during qualification of the actuators.

Thus, at the end of the flight, processing means 5 send the result (i.e. the aggregate values) of the damage indicators to control module 15. This then stores the aggregate values of the damage indicators in memory 7a integrated in actuator 1. The fact that only the results of the calculations are stored means that the dimensions of memory 7a of actuator 1 can be minimised.

In a variant, the series of measurements observed during each flight of the aircraft can be recorded continuously in storage means (not represented) on board the aircraft, without using the computing power of processing means 5 in flight. Processing means 5 begin computing all the damage indicators only when the aircraft is no longer in flight. All the damage indicators are then recorded in the storage means. It will be noted that in the embodiment in which actuator 1 is fitted with a memory 7a physically attached to actuator 1 the series of measurements are not recorded in this memory 7a but in various storage means on board the aircraft. Only the aggregate values of the damage indicators are recorded in memory 7a of actuator 1.

Figure 3:
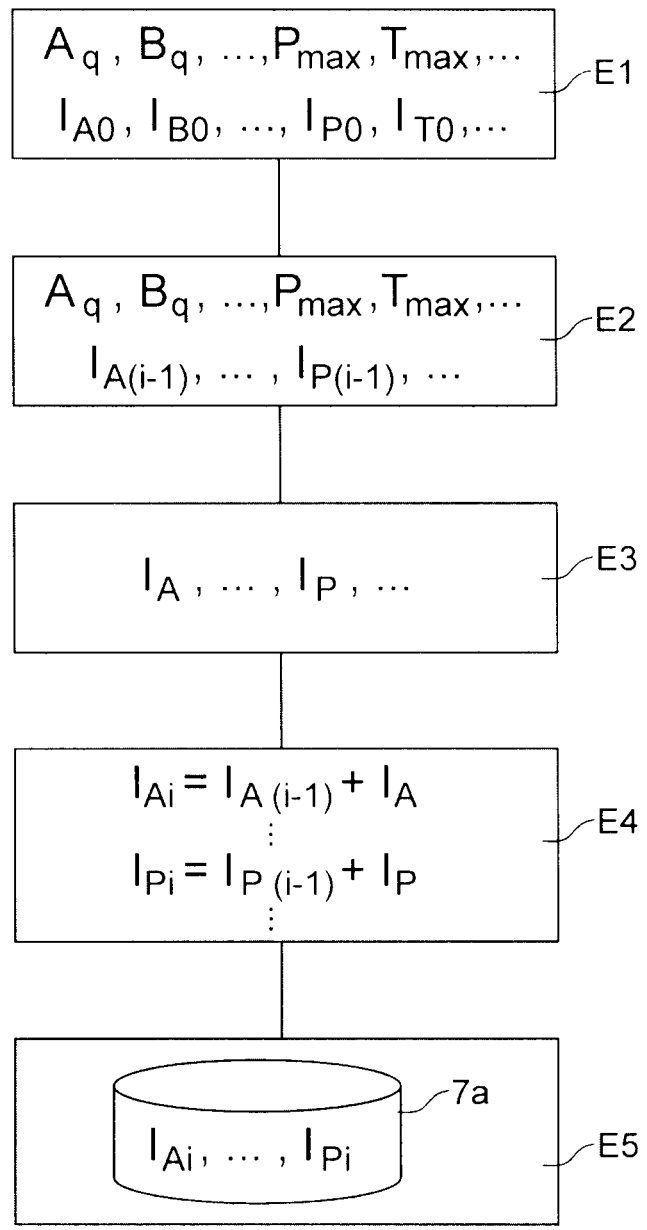
FIG. 3 is an algorithm illustrating an example of monitoring of the actuator over a lifetime of the aircraft according to the invention.

FIG. 3 is an algorithm illustrating an example of monitoring of actuator 1 over a lifetime of the aircraft according to the invention. According to this example actuator 1 is fitted with a memory 7a, as illustrated in FIG. 2 and the data is processed in real time.

In a preliminary stage, during a qualification phase, the actuator is qualified for a lifetime of the aircraft, as defined by theoretical flight missions, by using conventional rationalisation methods (for example the Rainflow method). This prior qualification phase will be undertaken using the same metering and computation system as the one used in service. By this means the estimated service life deduced from the qualification is directly comparable with the indicator calculated on the aircraft. The estimated service life is defined in accordance with the damage indicator at the time of the failure (for example a fatigue failure).

Let it be supposed that the tested total of the qualification includes, for example, the following reference values and thresholds:

$A_q$ is a first reference value representative of the fatigue severity, $B_q$ is a second reference value representative of the damage of the actuator's ball-and-socket joints, $C_q$ is a third reference value representative of a number of activations, $D_q$ is a fourth reference value representative of a total displacement, etc., $P_{max}$ is a threshold corresponding to a maximum limit pressure for the actuator, $T_{max}$ is a threshold corresponding to a maximum temperature, etc.

Damage indicators $I_A, I_B, I_C, I_D, \ldots, I_P, I_T$, etc. can then be designed including at least one indicator of expired estimated service life (for example fatigue indicator $I_A$) and/or at least one failure indicator (for example indicator $I_P$, indicating exceedance of pressure threshold $P_{max}$).

Step E1 is the initialisation of the memory fitted to a new actuator.

Thus, the above reference values and thresholds are recorded in the memory and the damage indicators are initialised ($I_{A0}=0, I_{B0}=0, I_{C0}=0, I_{D0}=0, \ldots, I_{P0}=0, I_{T0}=0$, etc.).

Steps E2-E5 are an aggregate metering undertaken continuously during several flights.

For example, during the first flight, the aggregate metering is $I_{A1}=I_{A0}+I_A, I_{B1}=I_{B0}+I_B, \ldots, I_{P1}=I_{P0}+I_P, I_{T1}=I_{T0}+I_T$, etc. where $I_A, I_B, \ldots, I_P, I_T$ are the current damage indicators observed during the current flight in question.

In the second flight, the aggregate metering is $I_{A2}=I_{A1}+I_A$, $I_{B2}=I_{B1}+I_B, \ldots, I_{P2}=I_{P1}+I_P, I_{T2}=I_{T1}+I_T$. In the $i^{th}$ flight the aggregate metering is $I_{Ai}=I_{A(i-1)}+I_A, I_{Bi}=I_{B(i-1)}+I_B, \ldots, I_{Pi}=I_{P(i-1)}+I_P, I_{Ti}=I_{T(i-1)}+I_T$, and so forth.

More specifically, steps E2-E4 are the aggregate metering undertaken continuously during the period of the $i^{th}$ flight.

In step E2 after the aircraft is started (flight number i), processing means 5 read the values recorded in memory 7a: $I_{A(i-1)}, I_{B(i-1)}, \ldots, I_{P(i-1)}, I_{T(i-1)}$, etc.

In step E3 control module 15 of actuator 1 continuously sends the signals originating from sensors 2a, 2b to processing means 5. The latter analyse in parallel, continuously and in real time the signals originating from sensors 2a, 2b. It will be noted that processing means 5 use processing programs based on the same algorithms used for the rationalisation of the theoretical missions used to dimension the actuator. The data processing may include analyses of the rationalisation type (fatigue, endurance) or metering type (number of exceedances, total displacement, number of flights, etc.).

For example, in the case of pressure signals transmitted by pressure sensor 3a, processing means 5 execute a rationalisation algorithm of the Rainflow type to analyse these signals and to meter cycles of forces or fatigue cycles in order to determine a current fatigue indicator $I_A$. This indicator $I_A$ represents a degree of damage relating to fatigue, and therefore defines an indication relating to the expired estimated service life.

Similarly, processing means 5 use the pressure signals to meter the number of current exceedances $I_P$ of maximum pressure threshold $P_{max}$. Exceedance indicator $I_P$ is a failure indicator. Indeed, a large number of exceedances of the maximum force able to be withstood by the actuator reflects the presence of an anomaly and of a risk of failure. In addition, it will be noted that every sudden variation of a parameter can also reflect the presence of a potential failure.

In step E4, at the end of the flight, the processing means define final values of current damage indicators $I_A, I_B, \ldots, I_P, I_T$ and add them one-by-one to the aggregate damage indicators in the previous flight $I_{A(i-1)}, I_{B(i-1)}, I_{P(i-1)}, I_{T(i-1)}$ to define a new set of damage indicators:

$I_{Ai}=I_{A(i-1)}+I_A, I_{Bi}=I_{B(i-1)}+I_B, \ldots, I_{Pi}=I_{P(i-1)}+I_P, I_{Ti}=I_{T(i-1)}+I_T$, etc.

In step E5, the new set of damage indicators $I_{Ai}, I_{Bi}, I_{Pi}, I_{Ti}$ is sent to control module 15 to store it in memory 7a of actuator 1.

Processing means 5 can also analyse the damage indicators, after each flight or a determined number of flights, in order to compare them with reference values $A_q, B_q, C_q$, etc., or threshold values $P_{max}, T_{max}$ etc., which were predetermined during the actuator qualification phase.

For example, in the $N^{th}$ flight, processing means 5 compare aggregate fatigue indicator $I_{AN}$ (indicating an expired estimated service life) with predetermined reference value $A_q$ in order to determine a remaining estimated service life of actuator 1. It will be noted that actuator 1 or the element concerned of the actuator will have reached its estimated service life when the associated indicator reaches the qualification reference value.

Similarly, processing means 5 can compare aggregate failure indicator $I_{PN}$ with predetermined threshold value $P_{max}$ in order to detect a risk of failure of the actuator.

It will be noted that real-time data processing (rationalisation or cumulative metering) of the measurements or spectra provided by sensors 3a-3d requires a dedicated computation power and dedicated temporary storage memory. The computation power required for rationalisation is non-negligible.

However, since all the damage indicators are mutually independent, the number of indicators can be restricted in accordance with the available computing power.

Thus, according to a first embodiment, if the available computing power is low, metering can be restricted, for example, to the number of flight cycles, to the number of flight hours, to the total displacement (sum of movements), to the number of exceedances of the limit load, and to the number of activations in the various possible modes. This enables the actuator's expired and remaining estimated service life to be estimated.

According to a second embodiment, if the available computing power is less limited, it is possible to use a rationalisation processing in addition to the meterings used above in the first embodiment. The spectra provided by sensors 3a-3d can thus be used to undertake a real-time automated rationalisation on an on-board computer, using the same rationalisation algorithms which were used during the qualification phase to define the fatigue and endurance qualification tests.

The invention claimed is:

1. A monitoring system for monitoring a flight control actuator of an aircraft, comprising:
   an actuator including:
      sensors that collect, during each flight of the aircraft, a series of measurements of parameters relative to said actuator,
      memory, physically integrated in said actuator, that stores a set of damage indicators, and
      a control module physically integrated in said actuator and connected to said sensors; and
   a processor, which is installed on board the aircraft and is external to said actuator, that calculates the set of damage indicators using, cumulatively, the series of measurements collected during each of the aircraft's flights,
   wherein said control module sends the series of measurements via a communication system of the aircraft to said processor, and
   wherein said processor calculates the damage indicators in real time, before sending the damage indicators to said control module, said control module storing the calculated damage indicators from said processor in said memory.

2. The monitoring system according to claim 1, wherein said processor:
   calculates current indicators representing a series of current measurements observed in each current flight of the aircraft of the aircraft's flights, and
   calculates damage indicators for the set of damage indicators by totaling, one-by-one in a corresponding fashion, each of the current indicators with each of the damage indicators, taken during one or more flights previous to each said current flight, and stored in said memory.

3. The monitoring system according to claim 1, wherein said processor analyzes the set of damage indicators to diagnose a state of damage of said actuator.

4. The monitoring system according to claim 1, wherein the set of damage indicators includes at least one indicator of expired estimated service life of said actuator, and said processor compares the at least one indicator of expired estimated service life with a predetermined reference value to determine a remaining estimated service life of said actuator.

5. The monitoring system according to claim 1, wherein the set of damage indicators includes at least one failure indicator indicating a risk of failure of said actuator, and said processor compares the at least one failure indicator with a predefined threshold value to detect a risk of failure.

6. The monitoring system according to claim 1, wherein the set of damage indicators includes at least one indicator from among the following: a number of flight cycles, a number of flight hours, total displacement, a number of times a limit load has been exceeded, a number of activations, a number of fatigue cycles, and a number of endurance cycles.

7. The monitoring system according to claim 1, wherein the series of measurements collected during each said flight of the aircraft is recorded in a second memory on board the aircraft, different from said memory of said actuator, and said processor calculates the set of damage indicators when the aircraft is not in flight.

8. An aircraft including the monitoring system according to claim 1.

9. The monitoring system according to claim 1, wherein said actuator, with said memory physically integrated therein, is removable from the monitoring system as a single unit.

10. The monitoring system according to claim 1, wherein said sensors include at least one position sensor that senses position of said actuator.

11. The monitoring system according to claim 1, wherein said sensors include at least one thermal sensor that senses a thermal characteristic of said actuator.

12. The monitoring system according to claim 1, wherein said sensors include two or more of at least one position sensor, at least one thermal sensor, and at least one pressure or stress sensor.

13. The monitoring system according to claim 1, wherein only aggregate values of the damage indicators are stored in said memory.

14. A method for monitoring a flight control actuator of an aircraft, the flight control actuator including a plurality of sensors, non-volatile memory and a control module connected to the plurality of sensors and the memory, the method comprising:
- collecting, during each flight of the aircraft, a series of measurements of parameters relative to the flight control actuator using the plurality of sensors;
- sending the series of measurements via a communication system of the aircraft to a external processor, which is installed on board the aircraft and external to the flight control actuator;
- calculating using the external processor a set of damage indicators, using, in cumulative fashion, the series of measurements collected during each of the aircraft's flights;
- sending the calculated set of damage indicators from the external processor to the non-volatile memory of the flight control actuator; and
- recording the set of damage indicators in the non-volatile memory, which is physically integrated in the flight control actuator.

15. A non-transitory computer-readable storage medium storing computer-readable instructions that, when executed by a computer, cause the computer to perform the method according to claim 14.

* * * * *